(12) United States Patent
Riabtsev et al.

(10) Patent No.: US 11,109,068 B1
(45) Date of Patent: Aug. 31, 2021

(54) ENHANCEMENT OF ERROR RESILIENCE IN LOW-LATENCY LIVE VIDEO STREAMING APPLICATIONS BY USING NON-IMMEDIATE PREVIOUS TEMPORAL REFERENCING

(71) Applicant: Electronic Arts Inc., Redwood City, CA (US)

(72) Inventors: Shevach Riabtsev, Haifa (IL); Yuval Noimark, Binyamina (IL); Osnat Makin Bacher, Talmei Elazar (IL)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 16/594,965

(22) Filed: Oct. 7, 2019

(51) Int. Cl.
*H04N 7/12* (2006.01)
*H04N 19/65* (2014.01)
*H04L 1/18* (2006.01)
*H04N 19/895* (2014.01)
*H04N 19/164* (2014.01)
*H04N 19/67* (2014.01)

(52) U.S. Cl.
CPC .......... *H04N 19/65* (2014.11); *H04L 1/1829* (2013.01); *H04N 19/164* (2014.11); *H04N 19/67* (2014.11); *H04N 19/895* (2014.11)

(58) Field of Classification Search
CPC .............................. H04N 19/65; H04N 19/895
See application file for complete search history.

(56) References Cited

PUBLICATIONS

Feamster, N., et al., "Packet Loss Recovery Streaming Video", M.I.T. Laboratory for Computer Science, 2002, ___ pages.
Schreier, R.M., et al., "Motion Adaptive Intra Refresh for the H.264 Video Coding Standard", 2006, ___ pages.

*Primary Examiner* — Y Lee
(74) *Attorney, Agent, or Firm* — McDermott Will & Emery LLP

(57) ABSTRACT

Various aspects of the subject technology relate to systems, methods, and machine-readable media for recovering lost information in a data stream. The method includes receiving the data stream having consecutive frames from a server, each frame encoded based on information from a preceding frame in an encoding order as reference. The method also includes detecting an error in the data stream. The method also includes sending an error message to the server regarding the error. The method also includes receiving a corrected frame encoded based on a distant reference frame that was received prior to detection of the error. The method also includes decoding the corrected frame.

18 Claims, 7 Drawing Sheets

US 11,109,068 B1

ENHANCEMENT OF ERROR RESILIENCE IN LOW-LATENCY LIVE VIDEO STREAMING APPLICATIONS BY USING NON-IMMEDIATE PREVIOUS TEMPORAL REFERENCING

TECHNICAL FIELD

The present disclosure generally relates to video streaming, and more particularly to enhancement of error resilience in low-latency live video streaming applications by using non-immediate previous temporal referencing.

BACKGROUND

Conventional techniques for addressing bitstream errors for video streaming applications, such as packet loss, late packets (i.e., packets arrived too late to be displayed) or unintentional bit-flipping, are accomplished through a decoder. Typically, the decoder performs error detection, error recovery (i.e., resynchronization), and error concealment. However, there are several issues that arise from having the decoder perform all the error handling. A major issue is that the errors cause a large portion of a picture to become corrupted (i.e., visually degraded). Error concealment usually reduces the visual degradation, but does not eliminate it. This problem is further exacerbated due to temporal prediction in video coding, such that visual impairments incurred by the bitstream error are propagated along the next frames. As such, the bitstream error generates a corruption wave which propagates in spatial-temporal directions until it is finally stopped and corrected by an I-frame or an intra-refresh sequence. As a result, clean-up and correction of these errors are undesirably bandwidth consuming, and also affect the user visual experience.

BRIEF SUMMARY

The subject disclosure provides for enhancement of error resilience in low-latency live video streaming applications by using non-immediate previous temporal referencing. According to an aspect, a decoder receives encoded frames from an encoder. Most modern video compression standards require that both the encoder and decoder contain several previous reconstructed (or decoded) pictures. The decoder sends an error message (e.g., acknowledgment) to the encoder when a bitstream error (e.g., packet loss) is detected. Upon receipt of the error message, the encoder encodes a current frame by utilizing a distant reference frame (e.g., which is believed to be clean of errors at a decoder side), rather than by using a preceding frame in an encoding order (e.g., which is corrupted at a decoder side). The new encoded frame (e.g., the correction frame) is sent to the decoder to stop the corruption wave incurred by the bitstream error, and thus improves visual perception quality.

According to one embodiment of the present disclosure, a computer-implemented method for recovering lost information in a data stream is provided. The method includes receiving the data stream having consecutive frames from a server, each frame encoded based on information from a preceding frame in an encoding order as reference. The method also includes detecting an error in the data stream. The method also includes sending an error message to acknowledge the server regarding the error. The method also includes receiving a corrected frame which is encoded based on a distant reference frame (e.g., a clean frame) that was properly received and decoded by the decoder prior to detection of the error. The method also includes receiving and decoding the corrected frame.

According to one embodiment of the present disclosure, a system is provided including a processor and a memory comprising instructions stored thereon, which when executed by the processor, causes the processor to perform a method for recovering lost information in a data stream. The method includes receiving the data stream having consecutive frames from a server, each frame encoded and decoded based on information from a preceding frame (in an encoding order) as reference. The method also includes detecting an error in the data stream. The method also includes sending an error message to the server regarding the error. The method also includes receiving a corrected frame encoded based on a distant reference frame (e.g., a clean frame) that was properly received and decoded prior to detection of the error. The method also includes decoding the corrected frame.

According to one embodiment of the present disclosure, a non-transitory computer-readable storage medium is provided including instructions (e.g., stored sequences of instructions) that, when executed by a processor, cause the processor to perform a method for recovering lost information in a data stream. The method includes receiving the data stream having consecutive frames from a server, each frame encoded and decoded based on information from a preceding frame (in an encoding order) as reference. The method also includes detecting an error in the data stream. The method also includes sending an error message to the server regarding the error. The method also includes receiving a corrected frame encoded based on a distant reference frame (e.g., a clean frame) that was properly received and decoded prior to detection of the error. The method also includes decoding the corrected frame.

According to one embodiment of the present disclosure, a system is provided that includes means for storing instructions, and means for executing the stored instructions that, when executed by the means, cause the means to perform a method. The method includes receiving the data stream having consecutive frames from a server, each frame encoded based on information from a preceding frame (in an encoding order) as reference. The method also includes detecting an error in the data stream. The method also includes sending an error message to the server regarding the error. The method also includes receiving a corrected frame encoded based on a distant reference frame (e.g., a clean frame) that was properly received and decoded prior to detection of the error. The method also includes decoding the corrected frame.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
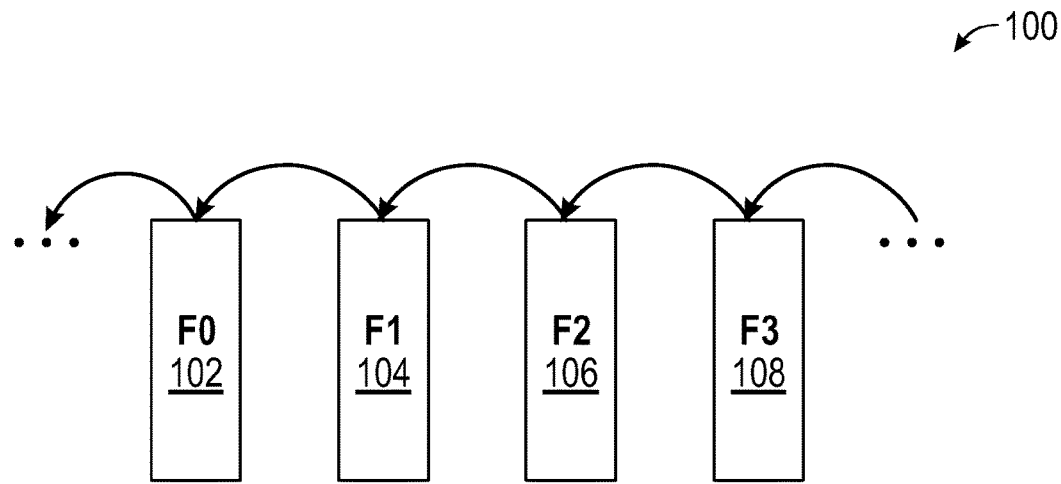
FIG. 1 illustrates a conventional low-latency bitstream including multiple frames.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Conventional techniques for addressing bitstream errors for internet applications, such as packet loss, late packets, or unintentional bit-flipping, are accomplished through a decoder. For example, the decoder may be tasked with performing error detection, error recovery, and error concealment. However, there are several issues that arise from having the decoder perform all of the error-related functions. A major issue is that the errors cause a large portion of a picture to become corrupted (e.g., visually degraded). Error concealment usually reduces the visual degradation, but does not eliminate it. Furthermore, the utilization of temporal prediction in frame coding causes the bitstream error to generate a corruption wave, which propagates in spatial-temporal directions until it is finally stopped and corrected by an I-frame or intra-refresh sequence. Clean-up and correction of these errors are undesirably bandwidth consuming. If not stopped, the errors would propagate in perpetuity, resulting in continuously corrupted scenes. As a result, it is important to promptly address and clean-up any bitstream errors.

Aspects of the present disclosure address these issues by providing systems and methods for recovering lost information in a data stream. In an implementation, a decoder receives encoded frames from an encoder. Both the encoder and the decoder contain several previous reconstructed (or decoded) frames in their own internal buffers (e.g., reference buffers) to be used as references in a temporal prediction process. Initially, the reference frames at both the encoder and the decoder sides are identical, otherwise a drift between the encoder and the decoder might incur serious visual distortions. The decoder sends an error message to the encoder when a bitstream error is detected. Upon receipt of the error message, the encoder utilizes a distant previously decoded frame as reference (e.g., which is clean of corruption at the decoder side) in coding of the current picture (e.g., the correction frame), rather than utilization of an immediately preceding frame(s) as reference. All other reference frames in the encoder's reference buffer are discarded (or ignored) since they are "dirty" at the decoder side and cannot be used for temporal prediction in processing of next frames. The correction frame avoids propagating visual impairments incurred by the bitstream error that may be present in preceding frames.

The disclosed system addresses a problem in traditional live video streaming tied to computer technology, namely, the technical problem of error resilience in low-latency live video streaming applications and improvement of visual perception quality in case of bitstream errors. The disclosed system solves this technical problem by providing a solution also rooted in computer technology, namely, by providing for non-immediate previous temporal referencing for error correction. The disclosed subject technology further provides improvements to the functioning of the computer itself because it reduces processing and bandwidth costs associated with correction of bitstream errors.

As used herein, the term "clean frame" refers generally to a last errorless frame prior to a corrupted frame.

As used herein, the term "correction frame" refers generally to a frame sent by a server to stop visual degradation as a result of a bitstream error.

FIG. 1 illustrates a conventional low-latency bitstream 100 having multiple frames 102-108. Each frame is used for reference by the next one to reduce bandwidth. For example, frame F1 104 references frame F0 102, frame F2 106 references frame F1 104, and frame F3 108 references frame F2 106.

Figure 2:
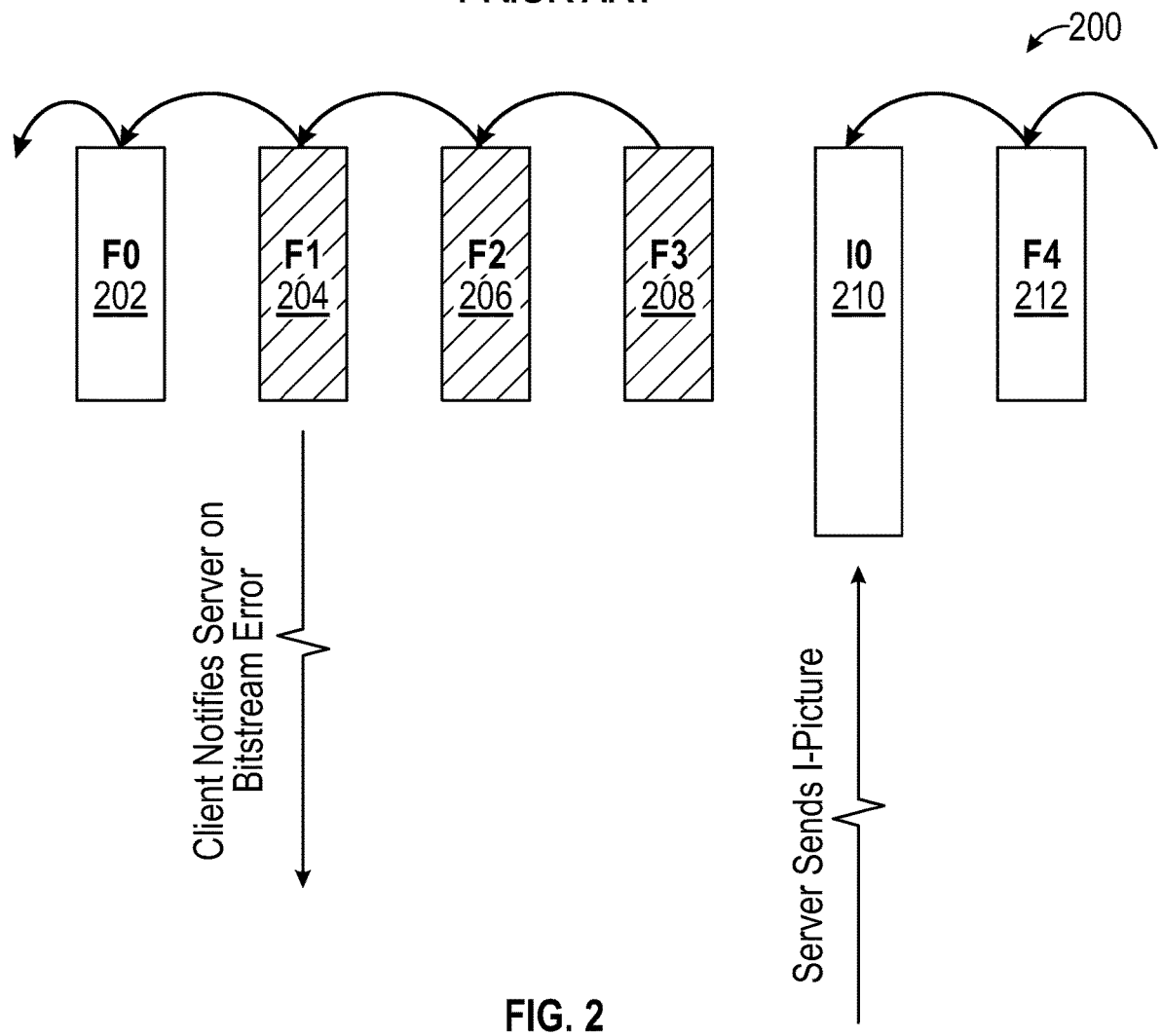
FIG. 2 illustrates conventional correction of an error in a bitstream through an intra prediction frame (I-frame) insertion.

FIG. 2 illustrates conventional correction of an error in a bitstream 200 by inserting an I-frame (e.g., frame I0 210). For example, the bitstream 200 includes frames F0 202 through F3 208. If a bitstream error, such as packet loss or bit-flip, takes place and is detected at frame F1 204, then the frame F1 204 and the following frames F2 206 and F3 208 are also visually degraded until insertion of the I-frame 210 stops error propagation. Visual impairments along the frames F2 206 and F3 208 occur because they are referencing the corrupted frame F1 204. Once the error notification arrives at the server, the encoder produces an I-frame to re-synchronize with the decoder. Frame F4 212 is clean since it references the I-frame 210, thus the error propagation is stopped. The downside of this conventional solution is that I-frame sizes tend to be several times greater than average frame sizes because temporal redundancy is not exploited in I-frames, as a result, I-frames cause a peak in bitrate, and it in turn increases the likelihood of further packet losses or late packets.

Figure 3:
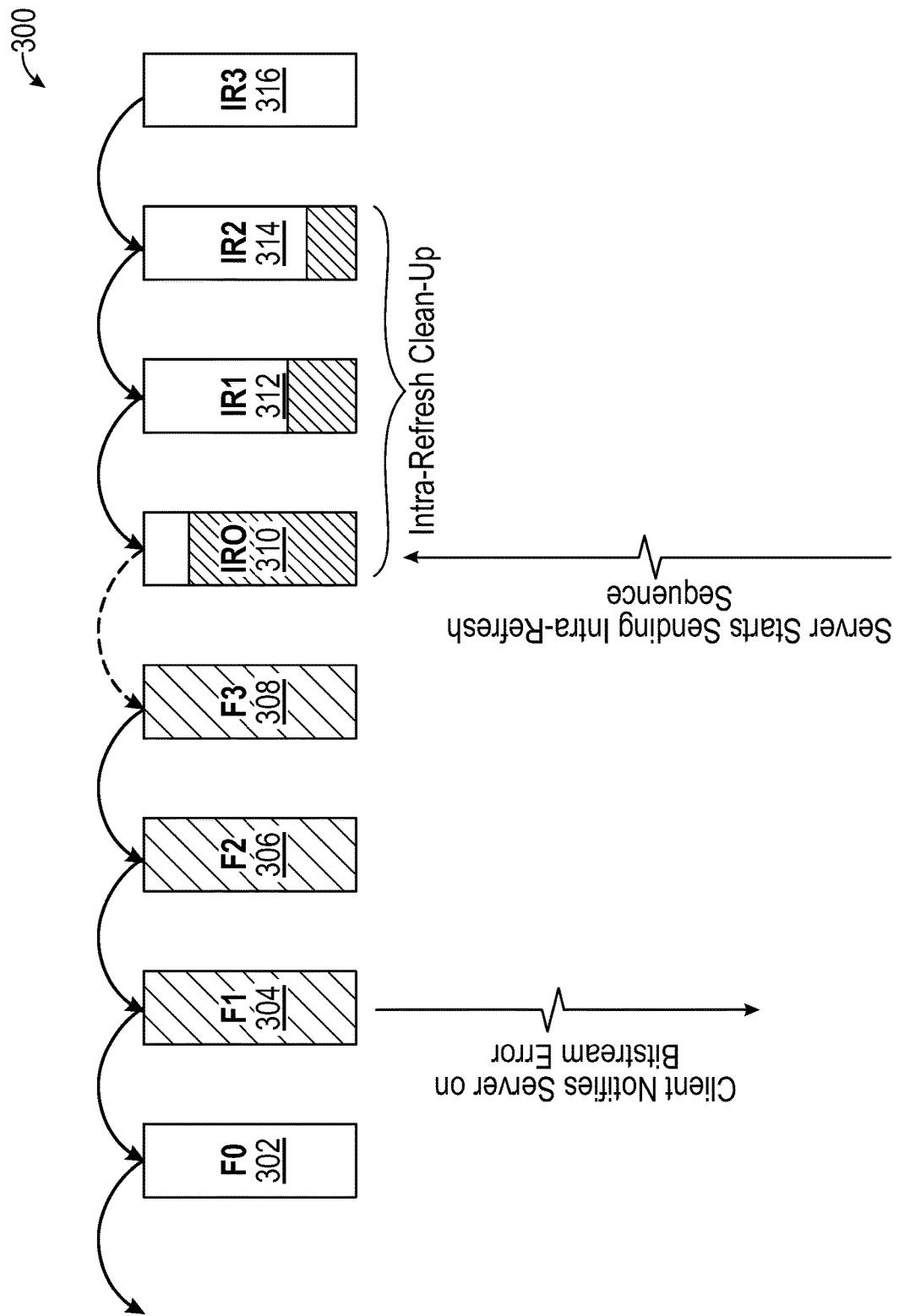
FIG. 3 illustrates conventional correction of an error in a bitstream through an intra-refresh cleanup sequence.

FIG. 3 illustrates conventional correction of an error in a bitstream 300 having frames F0 302, F1 304, F2 306, and F3 308 through intra-refresh cleanup with frames 1R0 310, IR1 312, IR2 314, and IR3 316. Similar to the above example in FIG. 2, the error occurs and is detected at frame F1 304. Frames 1R0 310, IR1 312, IR2 314, and IR3 316 (intra-refresh sequence) are received by the decoder from the encoder to stop error propagation. For example, frame 1R0 310 references corrupted frame F3 308, but the top slice of 1R0 310 is intra coded (i.e., without temporal prediction) and therefore the slice is clean of distortions. The second slice of the frame IR1 312 is intra coded to further reduce the corruption area, and third slice of the frame IR2 314 is intra coded to further reduce the corruption area. Finally, the bottom slice of frame IR3 316 is intra coded, and the intra coded slices of frames IF1 312 through IR3 316 cover the whole frame and consequently the corruption is eliminated.

Although intra-refresh sequence reduces bitrate peaks (an improvement over insertion of I-frames), the clean-up period is several frames long, which means potentially dozens of partly corrupted frames are displayed until video content is finally cleaned up. Thus, the visual artifacts are apparent to the viewer for a longer period of time. Moreover, the intra-refresh sequence constrains motion estimation and consequently coding efficiency is deteriorated.

Figure 4:
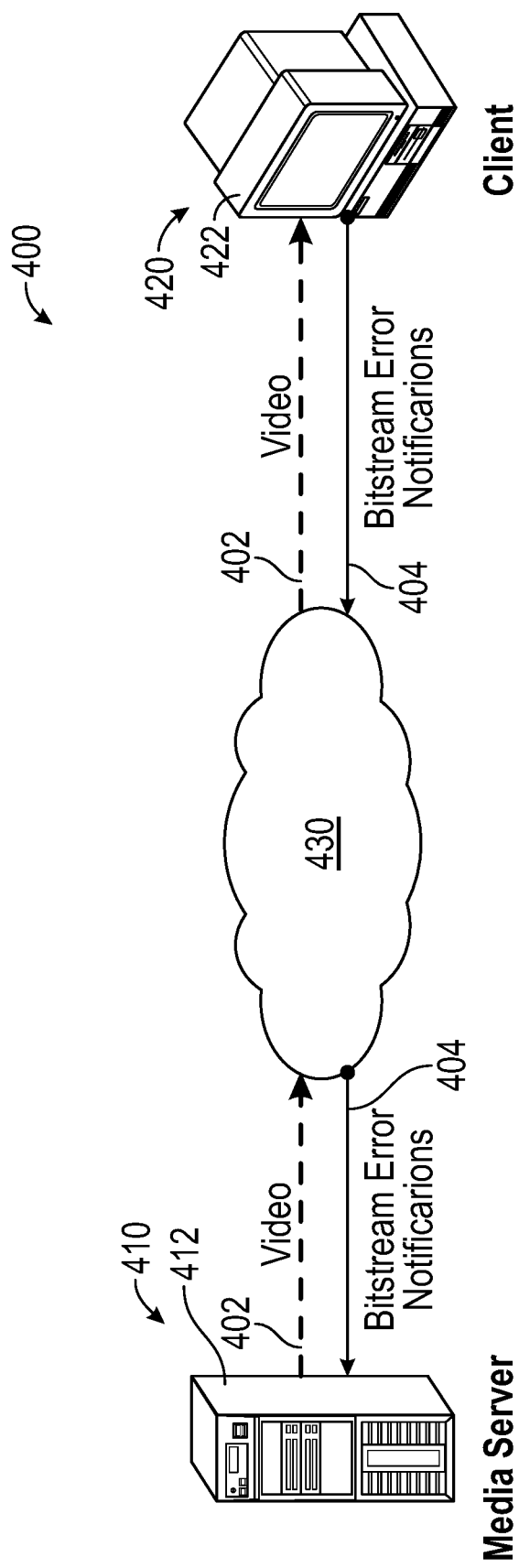
FIG. 4 illustrates an example system for streaming live video applications, according to certain aspects of the disclosure.

FIG. 4 illustrates an example system 400 for streaming live video applications, according to certain aspects of the disclosure. The system 400 may include a server 410 communicatively coupled to a client 420 through any communication channel 430 (e.g., the Internet). The server 410 may include an encoder 412 for encoding a video stream 402 (e.g., data stream) that is sent through the communication channel 430 to the client 420. The client 420 may include a decoder 422 for decoding the received video stream 402.

According to aspects, the decoder 422 at the client 420 may be configured to detect errors in the received video stream 402. Upon detection of errors by the decoder 422, the client 420 may send a bitstream error notification 404 (e.g., error message) with the corrupted frame number to the server 410. Upon receipt of the bitstream error notification, the encoder 412 may proceed to correct the error, as detailed further below. If not corrected, the error would propagate in perpetuity, resulting in continuously corrupted scenes. These corrupted scenes would negatively affect user experience, oftentimes rendering whole scenes unwatchable. As a result, it is important to promptly address and clean-up any bitstream errors to increase user satisfaction.

Figure 5:
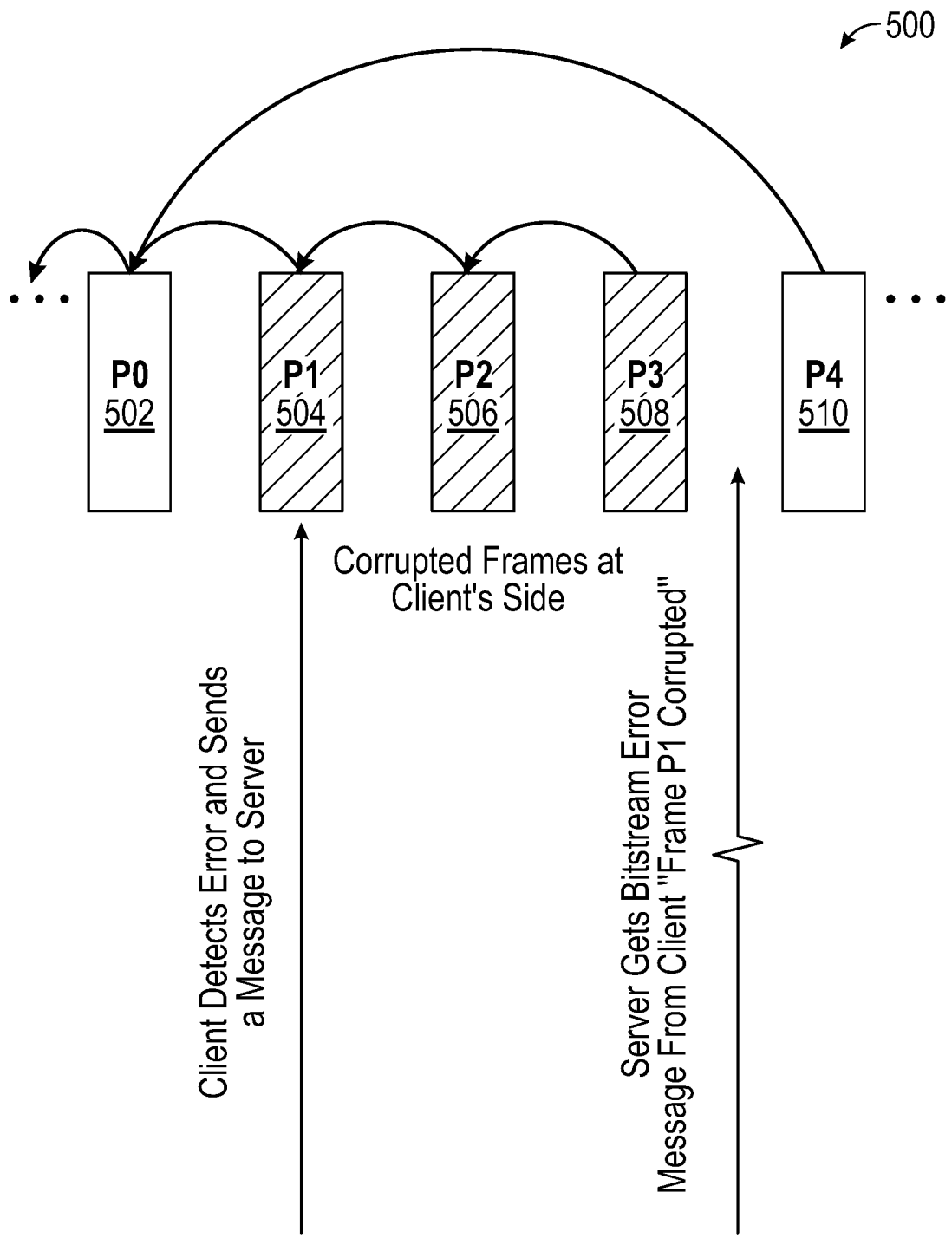
FIG. 5 illustrates a bitstream with errors that are corrected by referencing a distant previously decoded frame, according to certain aspects of the disclosure.

FIG. 5 illustrates a bitstream 500 (e.g., video stream) with errors in frame P1 504 that may be corrected by referencing a distant reference frame P0 502, according to certain aspects of the disclosure. For example, the client detects the error at frame P1 504 and sends a message to the server. The distant reference frame P0 502 may be a clean frame. For example, the bitstream 500 may be received by a decoder (e.g., decoder 422 of FIG. 4) from an encoder (e.g., encoder 412 of FIG. 4). The bitstream 500 may include multiple consecutive frames P0 502 through P4 510. It is understood that although only frames P0 502 through P4 510 are shown, additional frames may have been received prior to frame P0 502. It is further understood that frame P0 502 may be referred to as a clean frame because it is the last errorless frame received (i.e., received prior to the frame containing a bitstream error).

According to an aspect, the received bitstream 500 may contain a bitstream error in frame P1 504. The decoder may detect that an error has occurred in frame P1 504. The decoder may then send an error message with the first corrupted frame number P1 504 to the server regarding the error. The server may receive the error message and send the corrected frame P4 510 to the decoder. The corrected frame P4 510 may then be decoded without errors.

According to an aspect, the corrected frame P4 510 may reference frame P0 502 (e.g., a distant reference frame), rather than referencing frames P1 504, P2 506, and P3 508 (e.g., immediately preceding frames, which are assumed corrupted) to avoid perpetuating the error and visual artifacts. In an implementation, upon receiving the error message, the server may configure the encoder to utilize a distant reference frame (that is clean) and not immediately preceding frames as reference to stop error propagation at frame P4 510. For example, the encoder may be configured by the server to utilize only frame P0 502 for reference and to disregard frames P1 504, P2 506 and P3 508 because they are corrupted at the client side.

In an implementation, the corrected frame P4 510 may reference frame P0 502 because frame P0 502 is the last received errorless frame. Frames P0 502 through P3 508 may include visual distortions and therefore cannot be used for reference. It is understood that frames that were received prior to frame P0 502 may also be utilized as reference frames for the corrected frame P4 510.

According to additional aspects, the above-described process may be applied to both H.264/AVC, H.265/HEVC, AOMedia Video 1 (AV1), and other standards which utilize multi-reference mode.

It is advantageous to have the corrected frame P4 510 directly referencing the distant clean frame rather than utilizing an I-frame (as shown in FIG. 2) because it eliminates bitrate peaks due to temporal redundancy exploitation.

It is advantageous to have the corrected frame P4 510 directly referencing the distant clean frame rather than utilizing an intra-refresh sequence, as shown in FIG. 3. This is because intra-refresh prolongs visual distortions duration (e.g., intra refresh clean-up is not instantaneous, usually intra refresh sequence contains 15-30 frames) and consumes more bits.

Figure 6:
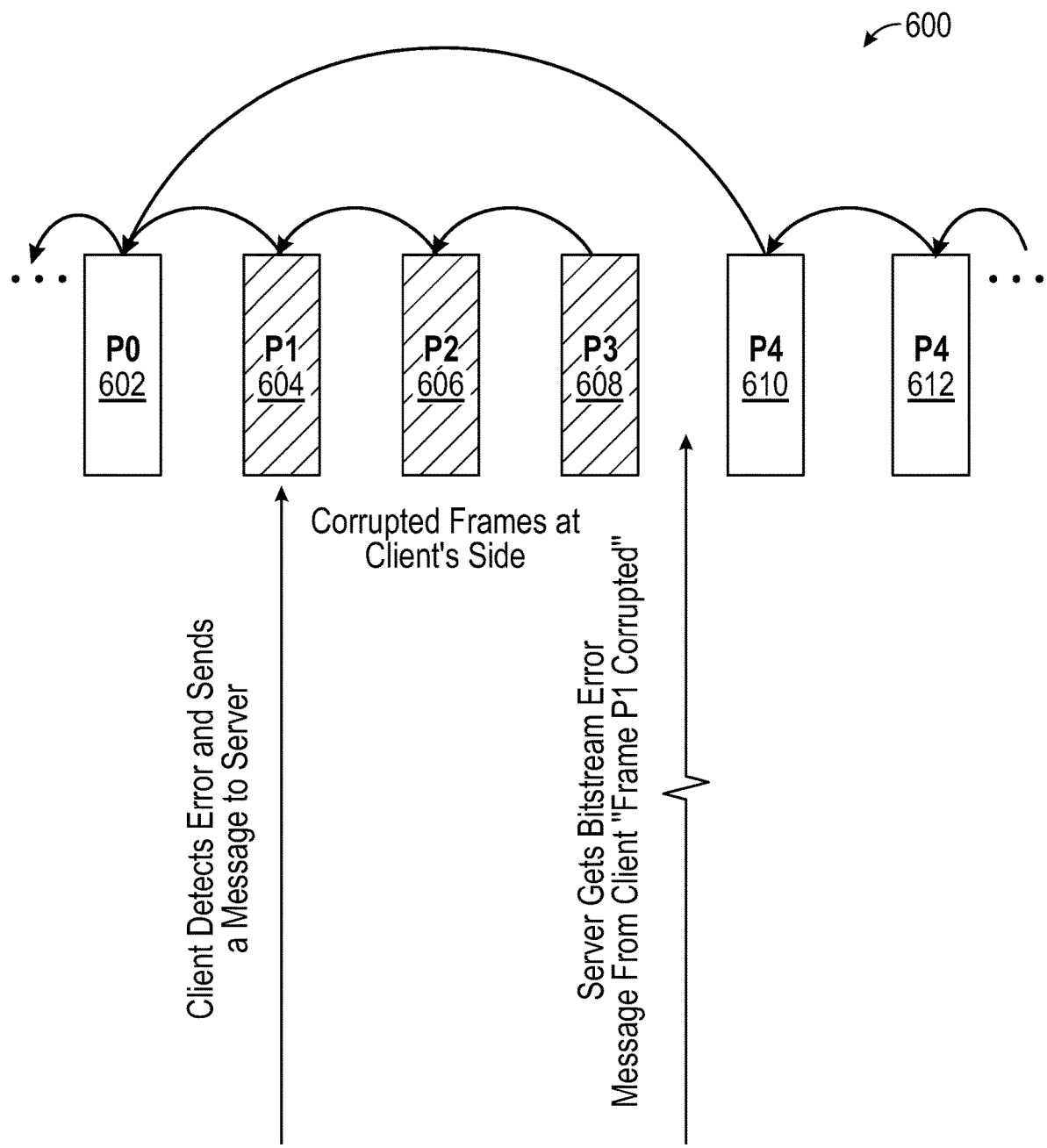
FIG. 6 illustrates a corrected bitstream with subsequent frames referencing to a corrected frame, according to certain aspects of the disclosure.

FIG. 6 illustrates a corrected bitstream 600 (e.g., video stream) with a subsequent frame P5 612 referencing a corrected frame P4 610, according to certain aspects of the disclosure. The corrected bitstream 600 may include a clean frame P0 602 with consecutive corrupted frames P1 604, P2 606, and P3 608 following it. The corrected frame P4 610 may be received by a decoder (e.g., the decoder 422) from an encoder (e.g., the encoder 412) through a process similar to the above-described process in FIG. 5.

According to an aspect, frame P5 612 (e.g., an immediately subsequent frame) does not reference corrupted frames (i.e., P1 604, P2 606 and P3 608). Furthermore, a subsequent frame after frame P5 612 may reference frame P5 612, and so on until if/when another error is detected by the decoder, at which time the above-described process in FIG. 5 may be repeated. In this way, visual distortions incurred by bitstream errors may be corrected without additional bitstream peaks or prolonged visual degradation periods.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 7:
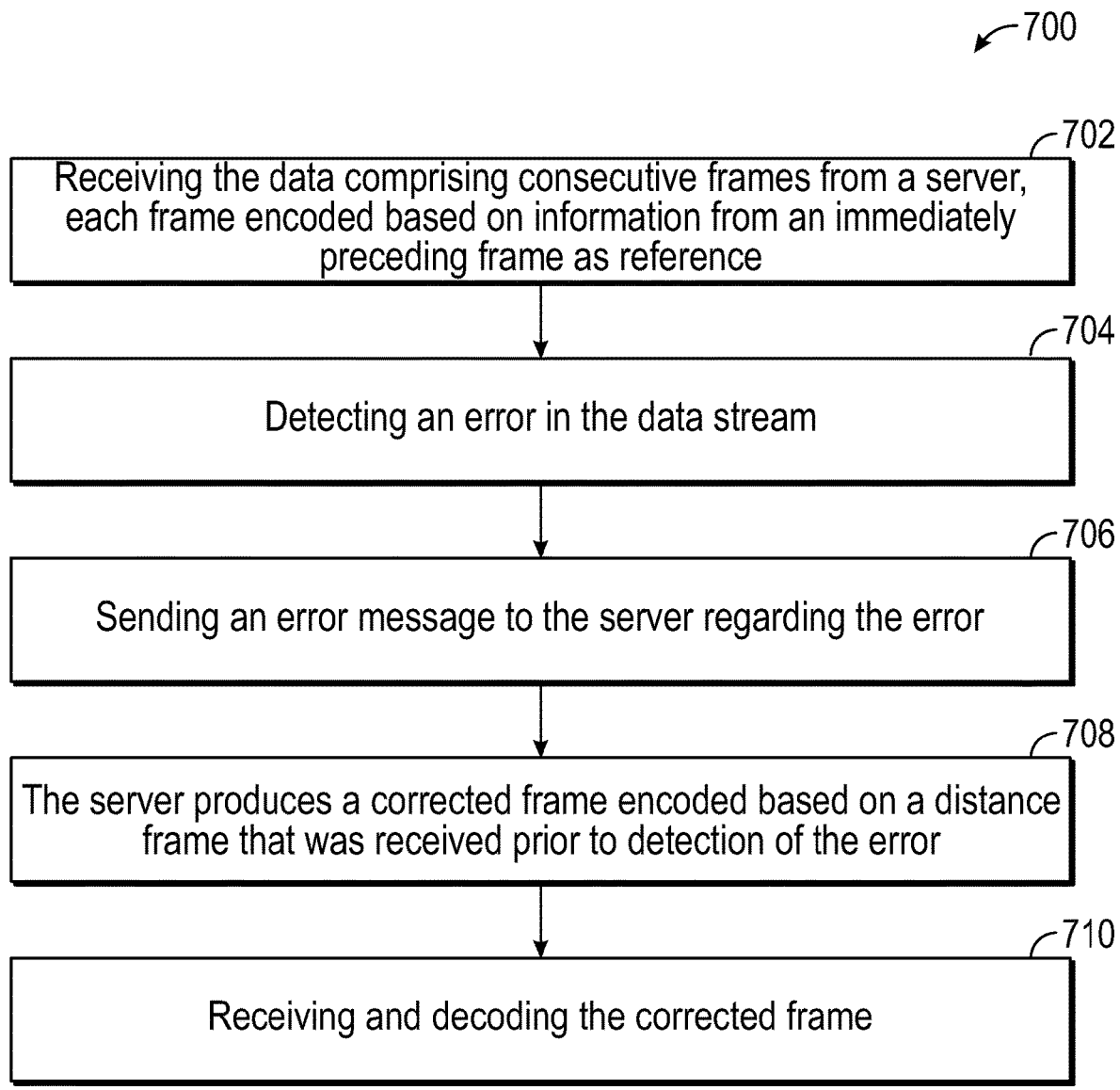
FIG. 7 illustrates an example flow diagram for recovering lost information in a data stream, according to certain aspects of the disclosure.

FIG. 7 illustrates an example flow diagram (e.g., process 700) for recovering lost information in a data stream, according to certain aspects of the disclosure. For explanatory purposes, the example process 700 is described herein with reference to FIGS. 4-6. Further for explanatory purposes, the steps of the example process 700 are described herein as occurring in serial, or linearly. However, multiple instances of the example process 700 may occur in parallel. For purposes of explanation of the subject technology, the process 700 will be discussed in reference to FIGS. 4-6.

At step 702, a data stream including consecutive frames is received at a client from a server. Each frame may be encoded based on information from a preceding frame (in an encoding order) as reference. At step 704, an error in the video stream is detected by the server. The error may occur after a clean frame. At step 706, an error message containing a frame number where the error is detected is sent to the server regarding the error. At step 708, a corrected frame is received that is encoded based on a distant reference frame.

The distant reference frame may have been received prior to detection of the error. For example, the corrected frame may be generated by the server based on the distant reference frame. In an implementation, the server produces a corrected frame encoded based on a distant frame that was received prior to detection of the error. At step 710, the corrected frame is received and decoded by the client.

For example, as described above in relation to FIGS. 4-6, at step 702, a data stream (e.g., video stream 402) including consecutive frames P0 602, P1 604, P2 606, and P3 608 are received at a client 420 from a server 410. Each frame may be encoded based on information from a preceding frame in an encoding order as reference. For example, frame P0 602 immediately precedes frame P1 604, and so forth. At step 704, an error in the data stream is detected by a client 420. For example, the error may occur and be detected by the client 420 at frame P1 604. Consequently, frame P1 604 gets visually corrupted and the corruption is propagated to subsequent frames until the correction frame arrives from the server. At step 706, an error message (e.g., bitstream error notification 404) is sent to the server 410 regarding the error with an indication of the corrupted frame. At step 708, a corrected frame P4 610 is encoded by the encoder 412 based on a distant clean reference frame (e.g., frame P0 602). The distant reference frame may have been received prior to detection of the error. For example, the distant reference frame may be frame P0 602. The distant frame may have been received several frames ago (e.g., at least four frames ago). In an implementation, the corrected frame is generated based on the distant frame by the server. At step 710, the corrected frame P4 610 is received by the client and decoded. An immediately subsequent frame (e.g., frame P5 612) may then be decoded by referencing the corrected clean frame P4 610. For example, the corrected frame may be received and decoded by the client. A subsequent frame (e.g., a frame received immediately after frame P5 612) may reference the immediately subsequent frame.

According to an aspect, sending the error message may include identifying a corrupted frame to the server in order to enable the server to select a clean frame from its reference frames' buffer. In an implementation, both the encoder (or the server) and the decoder keep reference frames' buffers in a coherent way (i.e., each reference frame in one buffer is identical to a corresponding reference frame in another buffer). If the coherency between the reference frames' buffers is violated (e.g., due to bitstream error) then visual degradation might occur.

According to an aspect, the frames may include encoded video information.

According to an aspect, the data stream may include video encoded data obtained via video compression, such as H.264/AVC, H.265/HEVC, AOM AV1 encoded data, or other video compression standards or methods supporting multiple references encoded data.

According to an aspect, the process 800 further includes receiving an immediately subsequent frame (e.g., frame P5 612) after the corrected frame that was encoded based on clean frame(s) (e.g., the corrected frame P4 610).

According to an aspect, the process 700 further includes receiving a subsequent frame after the immediately subsequent frame (e.g., frame P5 612) that was encoded based on clean frame(s).

According to an aspect, the process 700 further includes, detecting the error in the video stream received on the client (e.g., packet loss detection, or late packet detection).

According to an aspect, the process 700 further includes decoding a first corrupted frame with or without error concealment or discarding the first corrupted frame. According to an aspect, the process 700 further includes, decoding subsequent frames after the first corrupted frame with or without error concealment or discarding the subsequent frames until a correction frame arrives.

Figure 8:
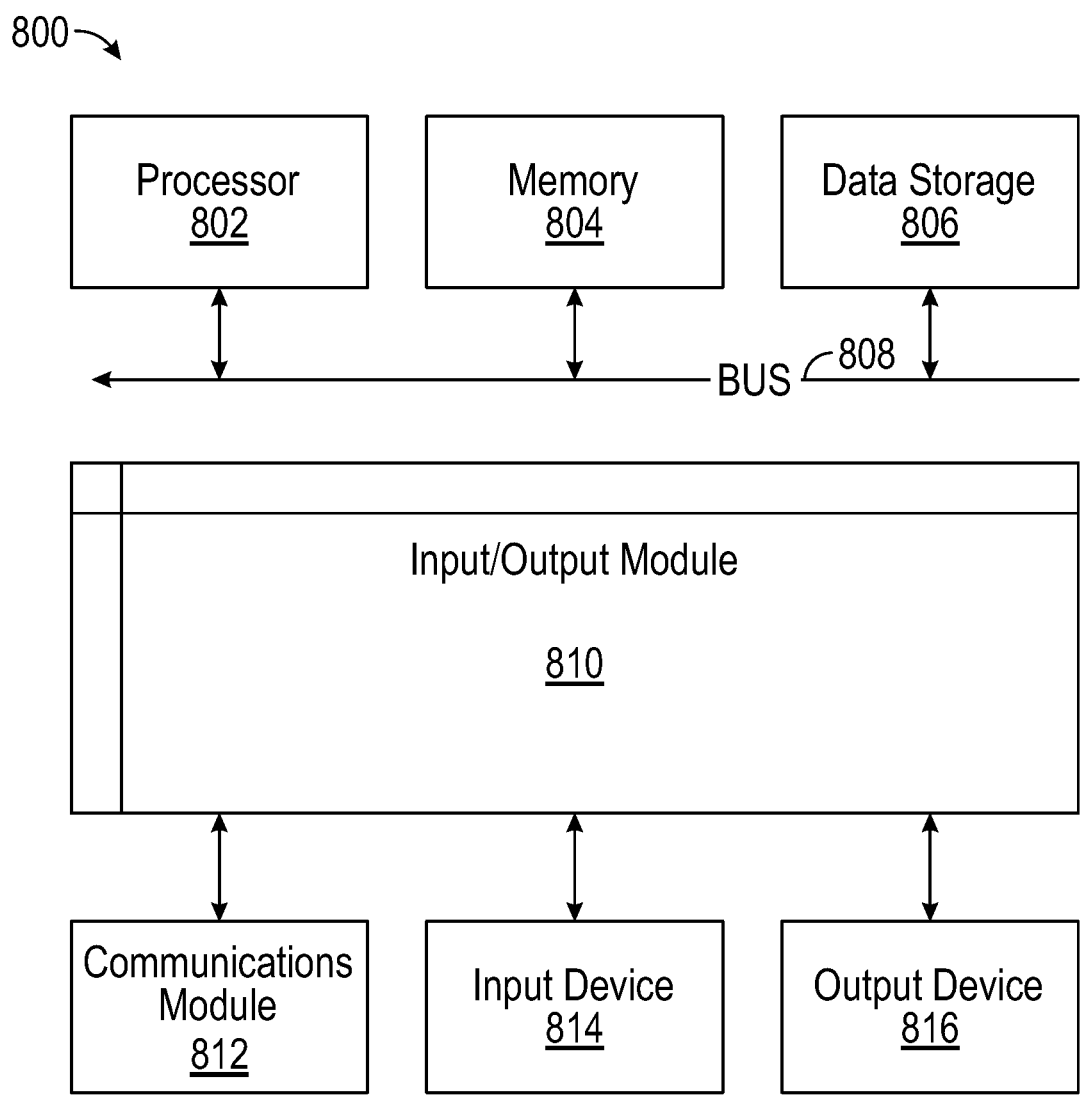
FIG. 8 is a block diagram illustrating an example computer system (e.g., representing both client and server) with which aspects of the subject technology can be implemented.

FIG. 8 is a block diagram illustrating an exemplary computer system 800 with which aspects of the subject technology can be implemented. In certain aspects, the computer system 800 may be implemented using hardware or a combination of software and hardware, either in a dedicated server, integrated into another entity, or distributed across multiple entities.

Computer system 800 (e.g., server and/or client) includes a bus 808 or other communication mechanism for communicating information, and a processor 802 coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer readable medium for execution by, or to control the operation of, the computer system 800, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 include networking interface cards, such as Ethernet cards and modems. In certain aspects, the input/output module 810 is configured to connect to a plurality of devices, such as an input device 814 and/or an output device 816. Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 816 include display devices such as a LCD (liquid crystal display) monitor, for displaying information to the user.

According to one aspect of the present disclosure, the above-described gaming systems can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in the main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 800 reads game data and provides a game, information may be read from the game data and stored in a memory device, such as the memory 804. Additionally, data from the memory 804 servers accessed via a network the bus 808, or the data storage 806 may be read and loaded into the memory 804. Although data is described as being found in the memory 804, it will be understood that data does not have to be stored in the memory 804 and may be stored in other memory accessible to the processor 802 or distributed among several media, such as the data storage 806.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for recovering lost information in a data stream with reduced visual perception degradation and eliminating bitrate peaks, comprising:
receiving the data stream comprising consecutive frames from a server, each frame encoded based on information from preceding frame(s) used as reference, the consecutive frames comprising at least a first frame, a second frame, a third frame, and a fourth frame;
detecting an error in the second frame of the data stream;
sending an error message to the server regarding the error;
receiving a corrected frame after the third frame and the fourth frame, the corrected frame referencing a distant reference frame and disregarding any frames received between the distant reference frame and the corrected frame, the distant reference frame received prior to detection of the error in the second frame, the distant reference frame comprising the first frame, the corrected frame separated from the distant reference frame by at least one frame, wherein the distant reference frame is directly referenced only by the corrected frame after detection of the error and the distant reference frame directly references a clean frame received immediately prior to the first frame;
decoding the corrected frame based on the distant reference frame;
receiving an immediately subsequent frame after the corrected frame, the immediately subsequent frame encoded based on the corrected frame; and
receiving a subsequent frame after the immediately subsequent frame, the subsequent frame encoded based on the immediately subsequent frame.

2. The computer-implemented method of claim 1, wherein the error occurs after the clean frame.

3. The computer-implemented method of claim 2, wherein the distant reference frame comprises the clean frame.

4. The computer-implemented method of claim 1, wherein the distant reference frame was received several frames ago.

5. The computer-implemented method of claim 1, wherein sending the error message comprises identifying a frame where a bitstream error is detected to the server.

6. The computer-implemented method of claim 1, further comprising:
receiving a corrupted frame from the server when the server detects the error in the data stream.

7. The computer-implemented method of claim 1, wherein the data stream comprises encoded video information.

8. The computer-implemented method of claim 1, wherein the data stream comprises video encoded data obtained via video compression.

9. A system for recovering lost information in a data stream, comprising:
a processor; and
a memory comprising instructions stored thereon, which when executed by the processor, causes the processor to perform:
receiving the data stream comprising consecutive frames from a server, each frame encoded based on information from preceding frame(s) used as reference, the consecutive frames comprising at least a first frame a second frame, a third frame, and a fourth frame;
detecting an error in the second frame of the data stream;
sending an error message to the server regarding the error;
receiving a corrected frame after the third frame and the fourth frame, the corrected frame referencing a distant reference frame and disregarding any frames received between the distant reference frame and the corrected frame, the distant reference frame received prior to detection of the error in the second frame, the distant reference frame comprising the first frame, the corrected frame separated from the distant reference frame by at least one frame, wherein the distant reference frame is directly referenced only by the corrected frame after detection of the error and the distant reference frame directly references a clean frame received immediately prior to the first frame;

decoding the corrected frame based on the distant reference frame;

receiving an immediately subsequent frame after the corrected frame, the immediately subsequent frame encoded based on the corrected frame; and receiving a subsequent frame after the immediately subsequent frame, the subsequent frame encoded based on the immediately subsequent frame.

10. The system of claim 9, further comprising stored sequences of instructions, which when executed by the processor, cause the processor to perform:

decoding a first corrupted frame with or without error concealment or discarding the first corrupted frame.

11. The system of claim 10, further comprising stored sequences of instructions, which when executed by the processor, cause the processor to perform:

decoding subsequent frames after the first corrupted frame with or without error concealment or discarding the subsequent frames until a correction frame arrives.

12. The system of claim 9, wherein the distant reference frame was received several frames ago.

13. The system of claim 9, wherein sending the error message comprises identifying a frame where a bitstream error is detected to the server.

14. The system of claim 9, further comprising stored sequences of instructions, which when executed by the processor, cause the processor to perform:

receiving a corrupted frame from the server.

15. A non-transitory computer-readable storage medium is provided including instructions that, when executed by a processor, causes the processor to perform a method for recovering lost information in a data stream, comprising:

receiving the data stream comprising consecutive frames from a server, each frame encoded based on information from preceding frame(s) used as reference, the consecutive frames comprising at least a first frame, a second frame, a third frame, and a fourth frame;

detecting an error in the second frame of the data stream;

sending an error message to the server regarding the error;

receiving a corrected frame after the third frame and the fourth frame, the corrected frame referencing a distant reference frame and disregarding any frames received between the distant reference frame and the corrected frame, the distant reference frame received prior to detection of the error in the second frame, the distant reference frame comprising the first frame, the corrected frame separated from the distant reference frame by at least one frame, wherein the distant reference frame is directly referenced only by the corrected frame after detection of the error and the distant reference frame directly references a clean frame received immediately prior to the first frame;

decoding the corrected frame based on the distant reference frame;

receiving an immediately subsequent frame after the corrected frame, the immediately subsequent frame encoded based on the corrected frame; and receiving a subsequent frame after the immediately subsequent frame, the subsequent frame encoded based on the immediately subsequent frame.

16. The non-transitory computer-readable storage medium of claim 15, wherein the method further comprises:

decoding a first corrupted frame with or without error concealment or discarding the first corrupted frame.

17. The non-transitory computer-readable storage medium of claim 16, wherein the method further comprises:

decoding subsequent frames after the first corrupted frame with or without error concealment or discarding the subsequent frames until a correction frame arrives.

18. The non-transitory computer-readable storage medium of claim 15, wherein the data stream comprises video encoded data obtained via video compression.

\* \* \* \* \*